United States Patent [19]
Weber et al.

[11] Patent Number: 5,768,882
[45] Date of Patent: Jun. 23, 1998

[54] TIE BAR FOR A POWER CONDUCTING CHAIN

[75] Inventors: Willibald Weber, Netphen; Helmut Bräutigam, Siegen, both of Germany

[73] Assignee: Kabelschlepp GmbH, Germany

[21] Appl. No.: 727,638

[22] PCT Filed: Apr. 12, 1995

[86] PCT No.: PCT/EP95/01363

§ 371 Date: Dec. 9, 1996

§ 102(e) Date: Dec. 9, 1996

[87] PCT Pub. No.: WO95/28582

PCT Pub. Date: Oct. 26, 1995

[30] Foreign Application Priority Data

Apr. 18, 1994 [DE] Germany .......................... 44 13 303.0

[51] Int. Cl.⁶ .................................................. F16G 13/16
[52] U.S. Cl. ................................ 59/78.1; 59/900; 248/49
[58] Field of Search ........................ 59/78.1, 900; 248/49

[56] References Cited

U.S. PATENT DOCUMENTS

| 3,716,986 | 2/1973 | Cork et al. |
|---|---|---|
| 4,626,233 | 12/1986 | Moritz ....................................... 59/78.1 |
| 5,048,283 | 9/1991 | Moritz et al. ............................. 59/78.1 |
| 5,201,885 | 4/1993 | Wehler et al. ............................ 59/78.1 |
| 5,220,779 | 6/1993 | Tatsuta et al. ............................ 59/78.1 |

FOREIGN PATENT DOCUMENTS

| A-0 161 417 | 3/1985 | European Pat. Off. . |
|---|---|---|
| A-0 415 050 | 7/1990 | European Pat. Off. . |
| 2210739 | 11/1973 | France . |
| 89 01 955.5 | 2/1989 | Germany . |
| 39 08 951 C1 | 4/1990 | Germany . |
| 41 05 653 A1 | 9/1992 | Germany . |
| 94 12 252.0 | 7/1994 | Germany . |
| A-1 073 438 | 6/1967 | United Kingdom . |

OTHER PUBLICATIONS

KabelSchlepp Product Catalogue (Bügel–und Bündelschellen), May 1992.

"Energiefuhrungsketten mi Kunststoff–Kettenbandern", Kabel Schlepp, pp. 1–13, Jul. 1989.

Primary Examiner—David Jones
Attorney, Agent, or Firm—Bardehle, Pagenberg, Dost, Altenburg, Frohwitter, Geissler

[57] ABSTRACT

A tie bar to be connected at the ends to the side parts of a chain link is described. The tie bar is provided with a fastening groove which is open toward the center of the chain link, which groove is delimited by two parallel beads which are connected to one another via a base plate. Strain relief elements for power lines can be fastened in the fastening groove. At least one connecting bore can be formed in the base plate, and the tie bar with the chain link forms a means of connecting a power conducting chain at a fixed point or a movable point.

20 Claims, 5 Drawing Sheets

TIE BAR FOR A POWER CONDUCTING CHAIN

BACKGROUND OF THE INVENTION

The invention relates to a tie bar which can be used in a power conducting chain.

EP-A-0,415,050 has disclosed a power conducting chain which can be constructed from standardized individual components from a construction kit. A chain link is formed from two side parts which can be of essentially identical shapes, and the side parts are connected by means of at least one tie bar. The side parts have coupling section, using which the chain links can be connected together. In order to fasten the power conducting chain at a fixed point or at a movable point, specially shaped side parts which each have a coupling section were provided, in order to be coupled to the final link of the power conducting chain. The construction kit system designed in this way requires a total of up to four different, specially shaped side parts, which can be used for connecting the power conducting chain. Furthermore, in order to connect the fixed point or the movable point and the power conducting chain at each of the specially shaped side parts, an angle element is also required.

Other possibilities are also known for fastening power conducting chains of this kind at a fixed point or at a movable point. For this purpose, for example, bushings are provided in each of the side parts of a standard chain link, which bushings run transversely to the chain direction and parallel to the side parts. Screws can be introduced into these bushings, by means of which screws the respectively final side parts of the power conducting chain can be fastened at the fixed point or the movable point. If the provision of special side parts for the final links of the power conducting chain is to be avoided, a bushing of this kind has to be provided in every side part of a standard chain link. Since strong forces have to be taken up at the fastening points of the power conducting chain, the region surrounding the bushings must also be of correspondingly reinforced construction. This means that a side part of this kind has to be of an unnecessarily large and heavy configuration.

DE-U-89 01 955 discloses a power conducting chain which is constructed from individual chain links. Each chain link comprises two detachable webs which are able to connect the side parts of the chain link together and can be fitted onto corresponding projections of the side parts, forming press fits. In order to fasten the power conducting chain at a fixed point or a movable point, the web of a final link is designed with a fastening lug.

SUMMARY OF THE INVENTION

The object of the present invention is to provide a possibility for fastening strain relief devices in the chain links themselves, in particular in the final links, in particular also as a retrofit for power conducting chains which are already in use. A further object of the invention is to provide a connecting means of this kind for power conducting chains which is such that the provision of special connecting links is no longer required.

According to one aspect of the invention, there is provided a tie bar having ends, to be connected at the ends to side parts of a chain link of a power conducting chain, wherein the bar comprises a fastening groove which is open toward the center of the chain link, which groove is delimited by two parallel beads having ends, the beads being connected to one another via a base plate, wherein said fastening groove is a fastener of strain relief elements.

The proposal according to the invention specifies a means of fastening strain relief devices in the chain links themselves, which can be produced easily and hence cost effectively. The tie bar can be used in particular for power conducting chains which are already in use, since it can be retrofitted in chains of this kind. In contrast to the known prior art, in particular it is possible to construct a power conducting chain from identical chain links. The provision of special side parts for the final links of the power conducting chain are avoided. This has the advantage that no additional tools are required for producing the final links.

Preferably, the fastening groove is formed by two bead-like elevations being integrally formed on one side of the base plate. It is furthermore preferred for the connecting devices to be arranged in the region of the ends of the bead-like elevations. Preferably, the connecting devices are bores into which screws can be screwed.

The cross section of the fastening groove of the tie bar can be of symmetrical or asymmetrical configuration, depending on the design of the elements to be fastened. The fastening groove preferably has undercuts.

The tie bar according to the invention is preferably cut to length from an aluminum profile piece. In particular, this aluminum profile piece is provided as an extruded section.

BRIEF DESCRIPTION OF THE DRAWINGS

Further advantages and possible applications of the present invention emerge from the following description of exemplary embodiments in conjunction with the drawings, in which.

DETAILED DESCRIPTION OF THE INVENTION

Figure 1:
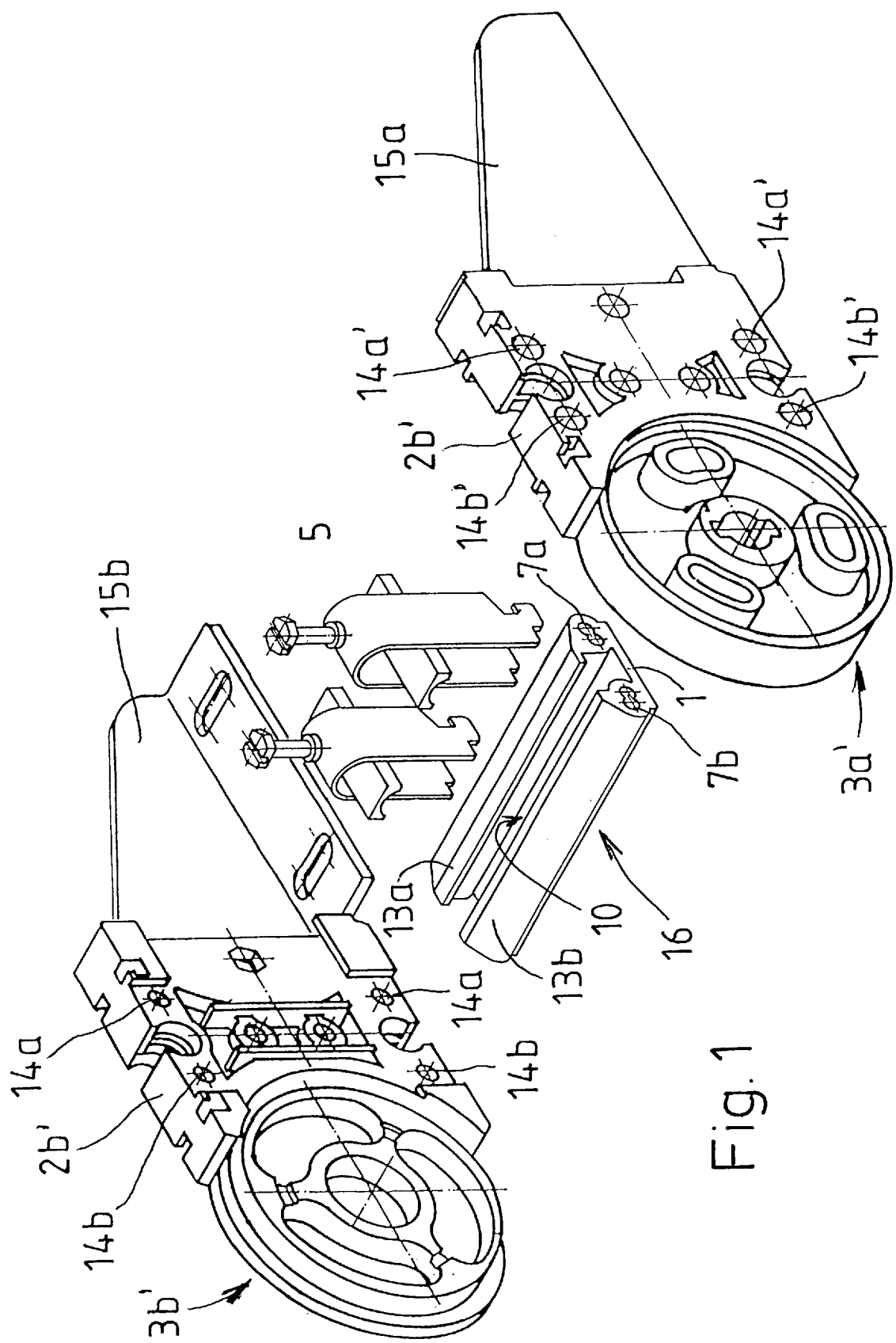
FIG. 1 shows a first exemplary embodiment of a tie bar of the invention before being assembled with side parts of a final link in a power conducting chain.

FIG. 1 shows an exploded view of a specially designal final chain link of a power conducting chain in which a tie bar 16 of the invention is to be installed. The final chain link has two specially shaped side parts 2a', 2b', which, for their part, each have at least one coupling section 3a', 3b', so that the final chain link can be connected to a power conducting chain. The coupling sections 3a', 3b' correspond in this case to the respective coupling sections of a standard chain link of the power conducting chain.

Angle elements 15a, 15b are in each case connected to the side parts 2a', 2b' of the final chain link, by means of which elements the chain link, and hence the entire power conducting chain, is fastened at a fixed point or a movable point of the power conducting chain. The tie bar 16 is arranged between the side parts 2a', 2b' of the chain link. For this purpose, bores 7a, 7b have been made in the ends of the tie bar 16, the spacing of which bores is adapted to the spacing of corresponding bushings 14a, 14b in the side parts 2a', 2b'. Screws which serve as connecting means between the tie bar 16 and the side parts 2a', 2b' can be screwed into the bores 7a, 7b.

The tie bar 16 is a profile body with two elongate beads 13a, 13b which between them define a fastening groove 10. The beads 13a, 13b are connected by a base plate 1, which defines the base of the fastening groove 10. The cross section of the fastening groove 10 in the exemplary embodiment shown in FIG. 1 is asymmetrical; symmetrical cross sections are, however, also possible. FIG. 1 also shows strain relief elements 5 which can be fastened in the fastening groove 10. Devices, in particular connecting bores 4, can be provided in the base plate 1 for connecting the tie bar 16 to a fixed point or a movable point of the power conducting chain. The tie bar 16 can, however, also be used in standard chain links, in particular final chain links, in particular also as a retrofit for power conducting chains which are already in use.

Figure 2:
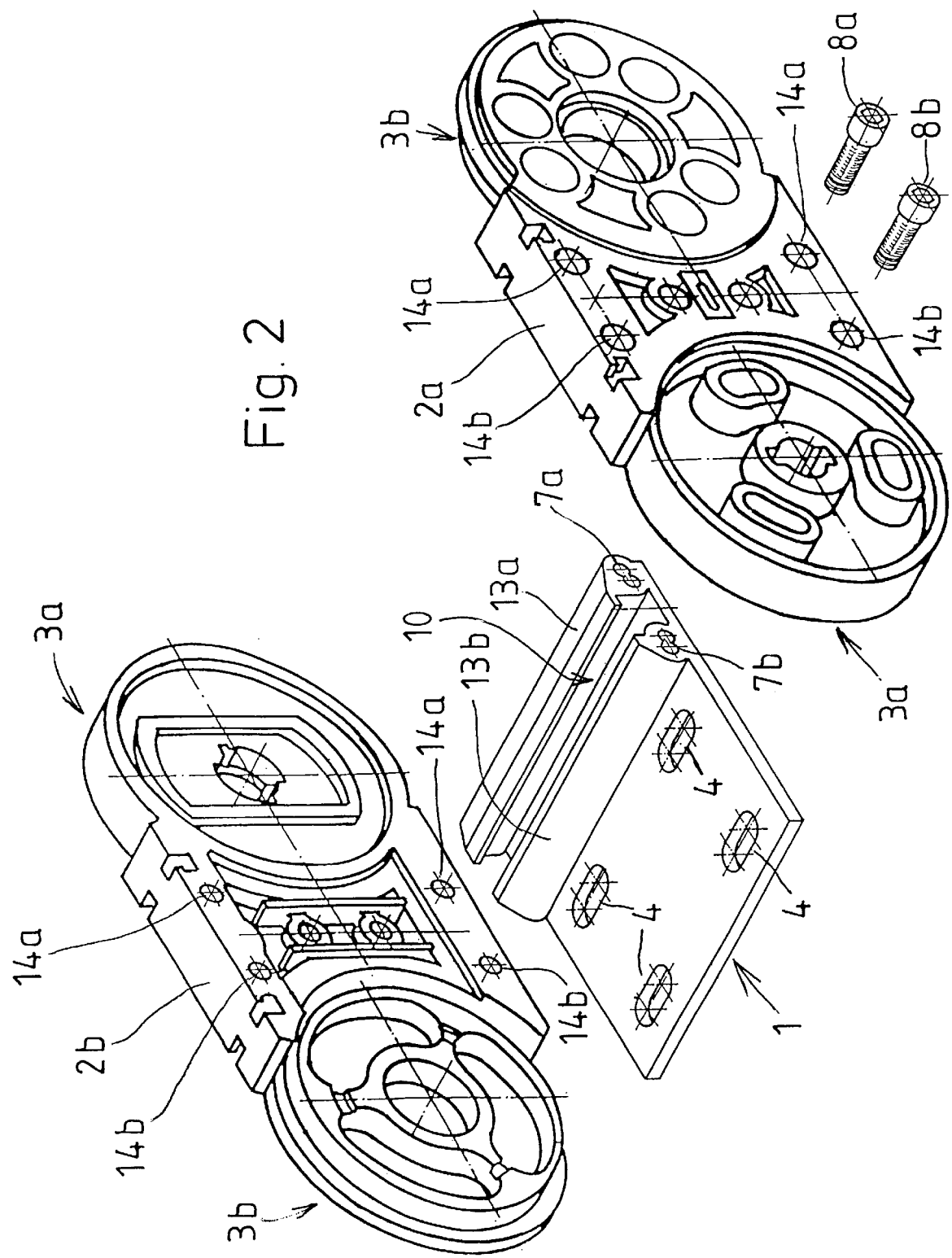
FIG. 2 shows a second exemplary embodiment of a tie bar of the invention before being assembled with side parts of a power conducting chain.

FIG. 2 shows an exploded view of a chain link of a power conducting chain in which an exemplary embodiment of a tie bar 16 with base plate 1 as connecting plate is used. The base plate 1 is arranged between two side parts 2a, 2b which are designed for standard chain links of the power conducting chain. The side parts 2a, 2b each have coupling sections, by means of which adjacent chain links are connected to one another. In a central section of the side parts 2a, 2b lying between the coupling sections 3a, 3b there are arranged in each case connecting bores 14a, 14b. In this case, each side part 2a, 2b has two sets of connecting bores 14a, 14b, so that the tie bar 16 can be mounted in at least two different positions.

The base plate 1 is essentially rectangular. In the exemplary embodiment shown, the base plate 1 has four bores, by means of which the base plate 1 can be mounted at a fixed point or at a movable point. Two bead-like elevations 13a, 13b are integrally formed at the edge of one side, the region lying between the bead-like elevations 13a, 13b forming a fastening groove 10. Bores 7a, 7b are provided at each of the ends of the bead-like elevations 13a, 13b. The spacing of the bores 7a, 7b is in this case adapted to the spacing of the bushings 14a, 14b of the side parts 2a, 2b.

As illustrated in FIG. 2, a plurality of adjacent bores 7a, 7b can be arranged at the ends of the bead-like elevations 13a, 13b, so that the base plate 1 is suitable for various types of side parts 2a, 2b. The side parts 2a, 2b are connected to the beads 13a, 13b via screws 8a, 8b, the screws being screwed into the bores 7a, 7b of the bead-like elevations 13a, 13b through the bushings 14a, 14b. This brings about a firm connection between the side parts 2a, 2b and the base plate 1 and consequently between the power conducting chain and the fixed point or the movable point.

Figure 3:
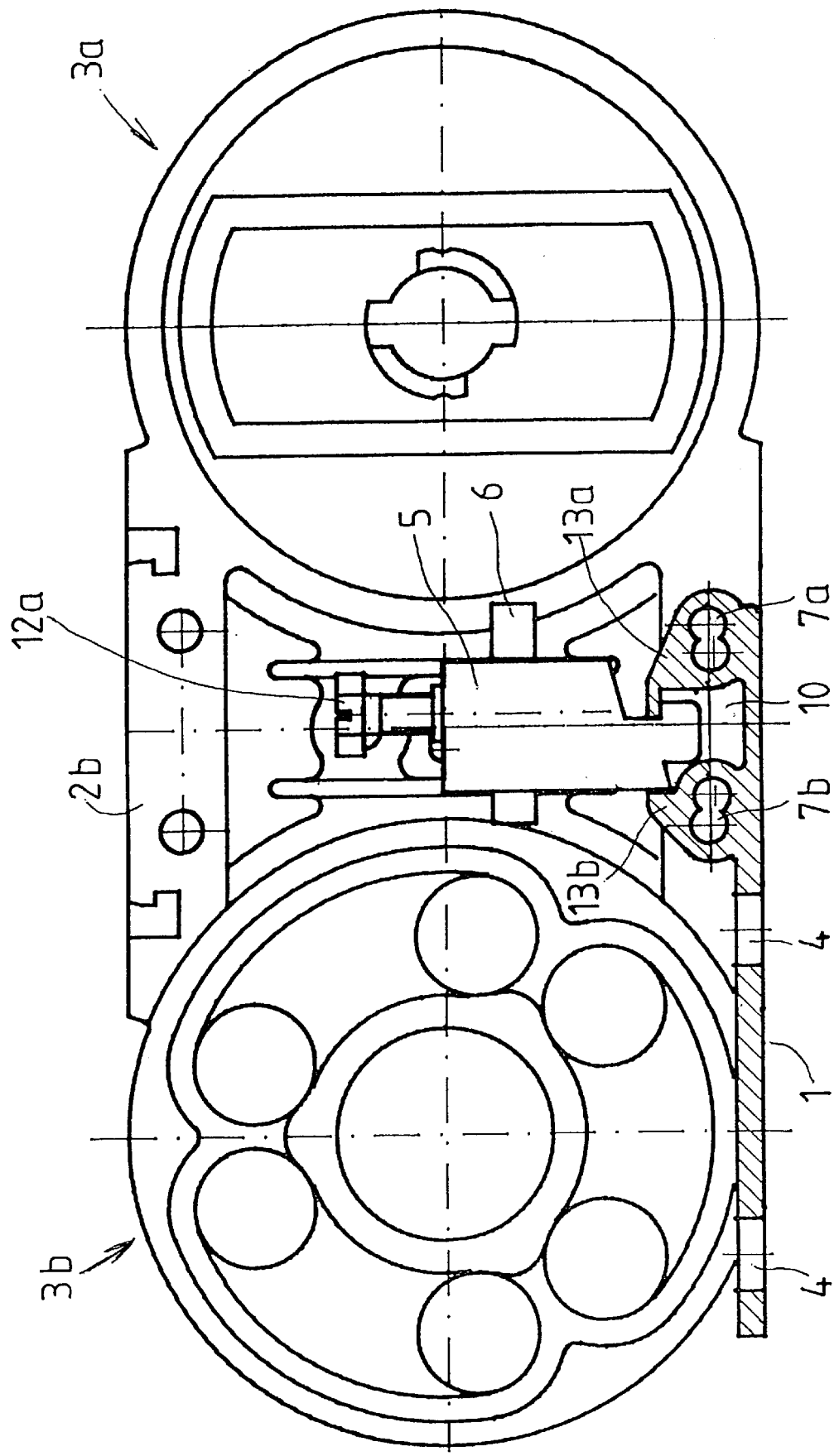
FIG. 3 shows a cross sectional side view of the assembled arrangement of FIG. 2.

FIG. 3 shows the cross section of a final chain link mounted in accordance with FIG. 2. The base plate 1 is illustrated in section, while the side part 2b appears in a side view. FIG. 3 illustrates that the bores 7a, 7b are arranged aligned with the bushings 14a, 14b of the side parts 2a, 2b, and that the underside of the base plate 1 comes to lie flush with the bearing surface of the side parts 2a, 2b.

FIG. 3 depicts a fastening groove 10 which is formed by the asymmetrical bead-like elevation 13a, 13b. A strain relief element 5 is inserted in this fastening groove 10. A power line 6 is fastened in the strain relief element 5 by a clamping screw 12a. The power line 6 is, for example, an electric cable. The asymmetrical fastening groove 10 makes it possible to insert the strain relief element 5 directly into the fastening groove 10, not having to be pushed in from the side. The strain relief element 5 is constantly held under a tensile stress by the tensile force of the power line 6 which is such that the strain relief element 5 cannot become detached from the fastening groove 10.

Figure 4:
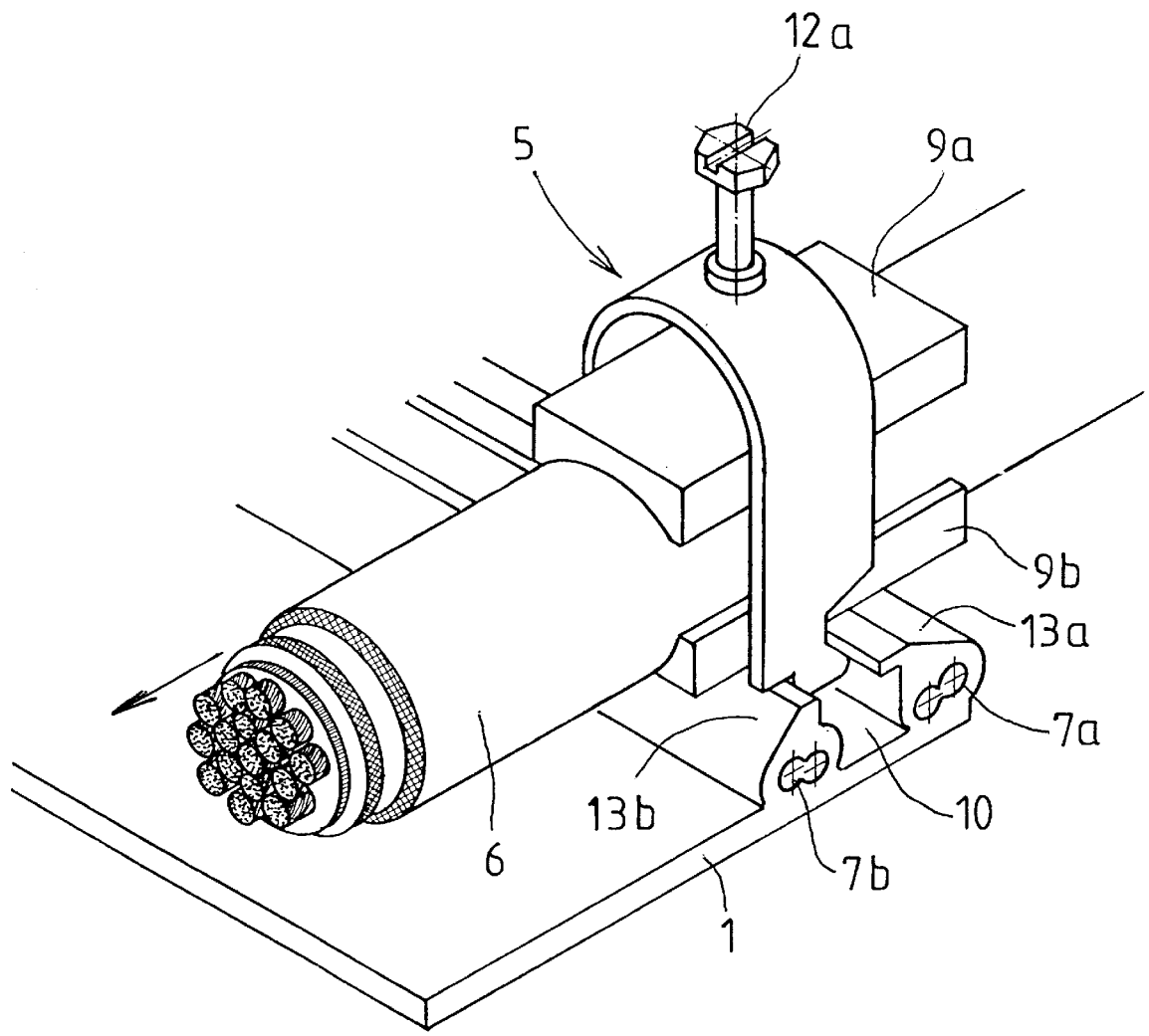
FIG. 4 shows an exemplary embodiment of a tie bar of the invention with an inserted strain relief device.

FIG. 4 shows the arrangement of a strain relief element 5 on the base plate 1 in detail. The power line 6 is fastened in the strain relief element by means of two clamping jaws 9a, 9b. It is necessary here for the power line 6 constantly to exert a tension, illustrated by the arrow in FIG. 4, on the strain relief element 5, so that the strain relief element 5 cannot become detached from the fastening groove 10.

Figure 5A:
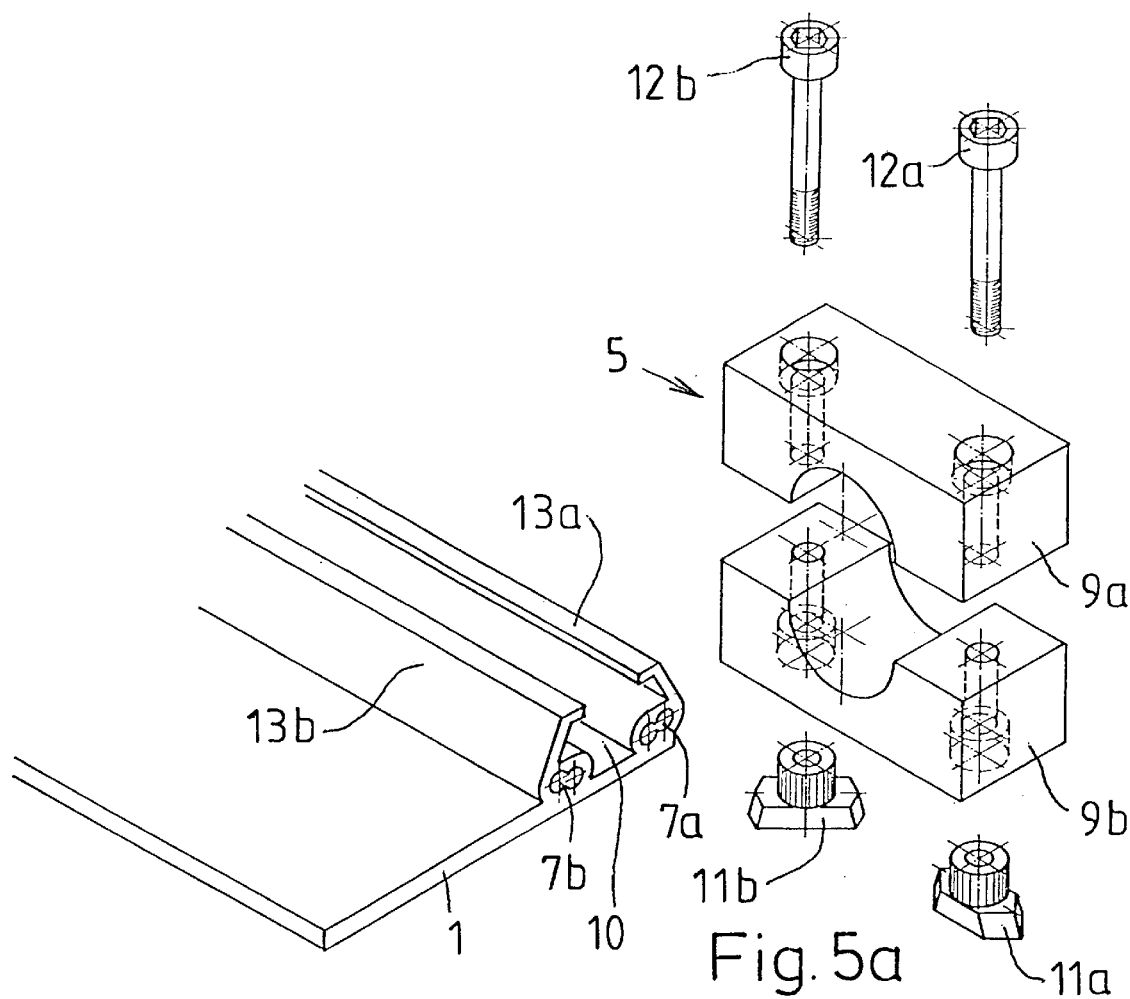
FIG. 5 shows an alternative configuration of the profile of the fastening groove of the tie bar in conjunction with a strain relief device designed for this profile.
Figure 5B:
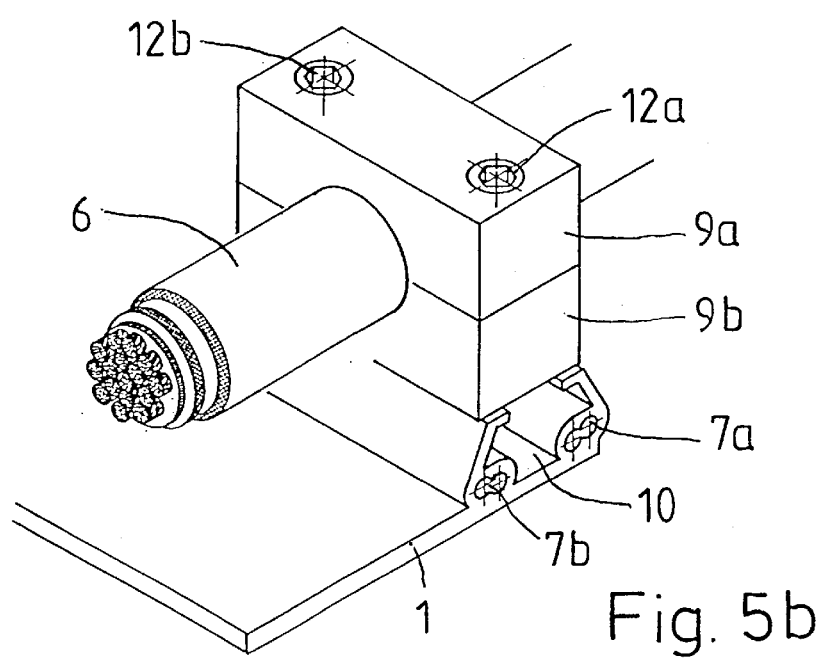

FIG. 5 depicts a different strain relief element, which can be used with a fastening groove 10 of essentially symmetrical configuration. FIG. 5a shows the base plate 1 and the strain relief element 5 in an exploded representation. The strain relief element 5 essentially comprises two clamping jaws 9a, 9b which can be connected by clamping screws 12a, 12b and specially configured fastening nuts 11a, 11b. The shape of the fastening nuts 11a, 11b is adapted to the cross section of the fastening groove 10. The head of the fastening nuts 11a, 11b is of elongate design, so that the fastening nuts 11a, 11b can be inserted into the fastening groove 10 in their longitudinal direction. The narrow ends of the head of the fastening nuts 11a, 11b are chamfered, so that the fastening nuts 11a, 11b can be turned in the fastening groove 10. The fastening nuts 11a, 11b then engage into the undercuts in the fastening groove 10. The clamping jaws 9a, 9b can then be fastened on the base plate 1 by means of the clamping screws 12a, 12b via the fastening nuts 11a, 11b which are in engagement with the fastening groove 10. FIG. 5b shows this arrangement in the assembled state. This strain relief element likewise does not have to be pushed on from the side of the fastening groove 10. Furthermore, owing to the engagement of the fastening nuts 11a, 11b in the fastening groove 10, it is no longer necessary to ensure a constant monodirectional tensile force on the line element 6, as is the case with the strain relief element 5 shown in FIG. 4.

The tie bar of the present invention can be used with standard side parts of a chain link of the power conducting chain. It is therefore no longer necessary to provide special side parts which are required for a final chain link. In addition to its function of connecting the final chain link at a fixed point or at a movable point, the tie bar also provides a fastening device by means of which elements which are to be provided in particular in a final chain link, such as for example strain relief elements, can be fastened. Furthermore, the tie bar thus has the advantage that the tensile forces of the power line situated in the power conducting chain are transferred directly onto the fixed point or the movable point at which the tie bar is fastened via corresponding bores. These tensile forces therefore do not act on the side parts of the final chain link, which would lead to these parts being subjected to particular stress.

Preferably, the tie bar of the invention consists of aluminum. In this case it is preferably cut to length from an extruded section. The tie bar can therefore be readily adapted to any desired width of a power conducting chain. This also applies to the hole pattern of the bores 4, which are preferably only made during final assembly.

What is claimed is:

1. Tie bar having ends, to be connected at the ends to side parts of a chain link of a power conducting chain, wherein the bar comprises a fastening groove which is open toward the center of the chain link, which groove is delimited by two parallel beads having ends, the beads being connected to one another via a base plate, wherein said fastening groove is a fastener of strain relief elements, wherein the fastening groove has an asymmetrical cross sectional form.

2. Tie bar according to claim 1, wherein at least one connecting bore is formed in the base plate.

3. Tie bar according to claim 2, wherein connecting devices are arranged at the ends of the beads.

4. Tie bar according to claim 3, wherein the connecting devices comprise bores for receiving screws.

5. Tie bar according to claim 2 or 4, wherein the fastening groove has a symmetrical cross sectional form.

6. Tie bar according to claim 2, wherein four connecting bores are arranged in the base plate.

7. Tie bar according to one of claims 2, 4 or 6, wherein the tire bar is cut to length from an aluminum profile piece.

8. Tie bar according to claim 6, wherein the four connecting bores are symmetrically arranged in the base plate.

9. Tie bar according to claim 7, wherein the tie bar is cut to length from an extruded section aluminum profile piece.

10. A power conducting chain, wherein the chain comprises at least one chain link having a tie bar having ends connected at the ends to side parts of the chain link, wherein the tie bar comprises a fastening groove which is open toward the center of the chain link, which groove is delimited by two parallel beads which are connected to one another via a base plate, wherein the chain link further comprises devices for the strain relief of a line element, wherein the devices are fastened in the fastening groove.

11. A chain as in claim 10, wherein said chain link is a final chain link.

12. Chain link of a power conducting chain, having a tie bar having ends to be connected at the ends to side parts of the chain link, wherein the tie bar comprises a fastening groove which is open toward the center of the chain link, which groove is delimited by two parallel beads which are connected to one another via a base plate, wherein said chain link is a final chain link in a power conducting chain and wherein at least one strain relief element is inserted in said fastening groove.

13. A chain link according to claim 12, wherein at least one connecting bore is formed in the base plate.

14. A chain link according to claim 12 or 13, wherein connecting devices are arranged at the ends of the beads.

15. A chain link according to claim 14, wherein the connecting devices comprise bores for receiving screws.

16. A chain link according to claim 14, wherein four connecting bores are arranged in the base plate.

17. A chain link according to claim 12, wherein the fastening groove has an asymmetrical cross sectional form.

18. A chain link according to claim 12, wherein the fastening groove has a symmetrical cross sectional form.

19. A chain link according to one of claims 13, 17, or 18, wherein the tire bar is cut to length from an aluminum profile piece.

20. Tie bar having ends, to be connected at the ends to side parts of a chain link of a power conducting chain, wherein the bar comprises a fastening groove which is open toward the center of the chain link, which groove is delimited by two parallel beads having ends, the beads being connected to one another via a base plate, wherein said fastening groove is a fastener of strain relief elements, wherein at least one connecting bore is formed in the base plate, wherein the fastening groove has an asymmetrical cross sectional form.

* * * * *